April 23, 1929.  P. H. MEISE  1,710,547
MOUNT FOR TELESCOPIC RIFLE SIGHTS
Filed April 21, 1928
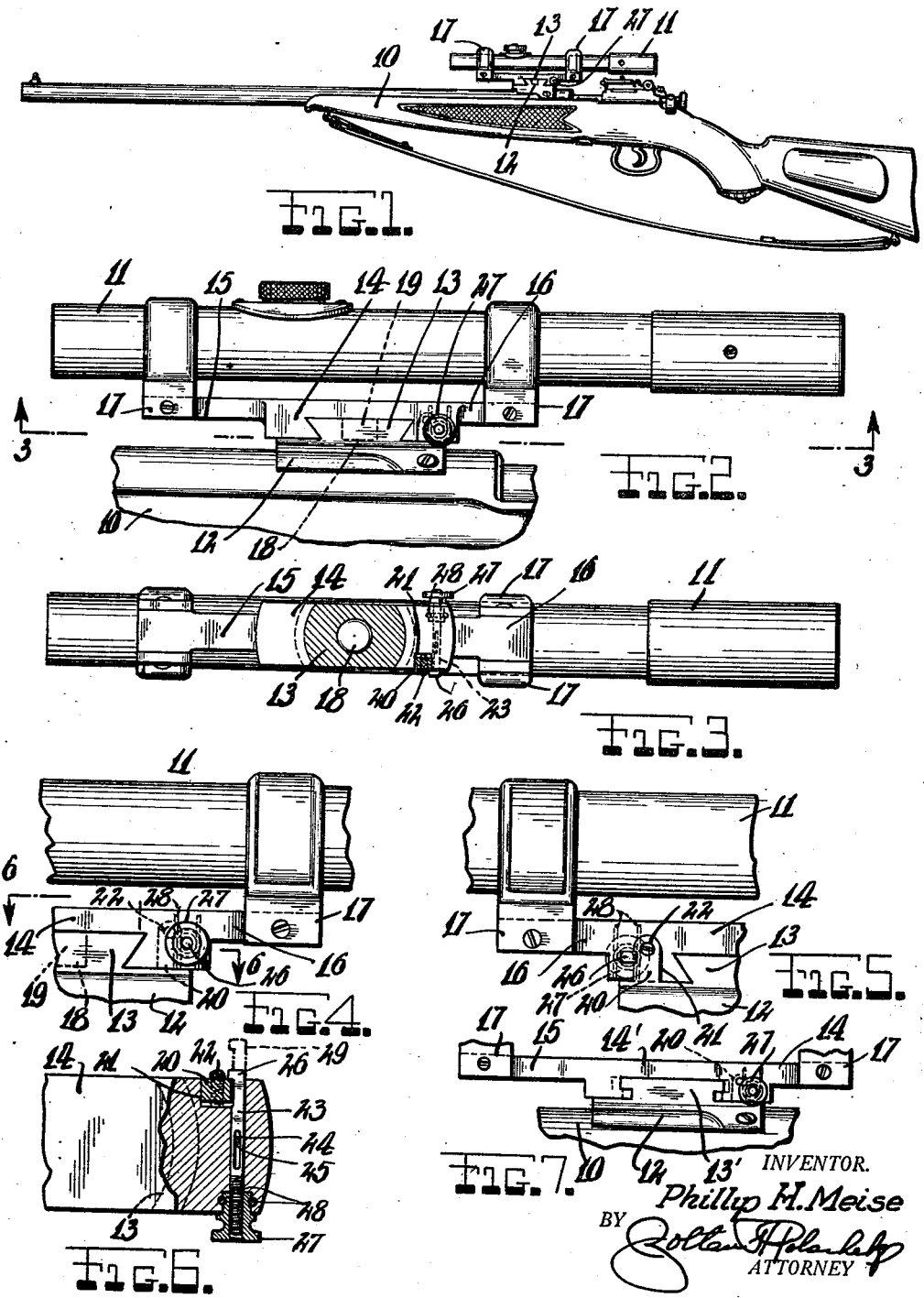
INVENTOR.
Phillip H. Meise
BY
ATTORNEY Patented Apr. 23, 1929.

1,710,547

UNITED STATES PATENT OFFICE.

PHILLIP H. MEISE, OF NEW YORK, N. Y.

MOUNT FOR TELESCOPIC RIFLE SIGHTS.

Application filed April 21, 1928. Serial No. 271,719.

This invention relates generally to rifles and telescopes, and has more particular reference to a novel telescope mount.

The invention has for an object the provision of a device of the class mentioned, which is of simple durable construction, desirable and efficient in action, and which can be manufactured and sold at a reasonable cost.

The device proposes the use of an abutment firmly connected with a rifle and provided with an adjustment screw, and a mount member pivotally connected to the rifle and engageable with the abutment and adjusting screw, and arranged for being held in engaged position, the said mount being connected with a telescope.

The advantage of this arrangement is that one telescope may be mounted on various rifles and truly aligned on each. This eliminates the necessity of a separate telescope for each rifle that a party owns.

Moreover, it is pointed out that the telescope may be quickly transferred from one rifle to another, and very accurately and quickly aligned for use.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:—

Fig. 1 is a side elevational view of a rifle and telescope mounted according to this invention.

Fig. 2 is an enlarged fragmentary detail view thereof.

Fig. 3 is a horizontal sectional view looking upwards, taken along the line 3—3 of Fig. 2.

Fig. 4 is a fragmentary detail view of a portion of Fig. 2.

Fig. 5 is a view of the rear side of Fig. 4.

Fig. 6 is a horizontal sectional view, taken on the line 6—6 of Fig. 4.

Fig. 7 is a side elevational view of a modified form of mounting.

The reference numeral 10 indicates generally a rifle, and numeral 11 a telescope of any design and construction. A mount base member 12 is attached to the rifle 10 and has a substantially circular projection 13 with inclined sides on the top thereof, these sides being inclined outwards from the bottom to the top. A mount member 14 rests upon the top of the base 12 and is rotatively engaged on the said projection 13.

The mount member 14 has a front arm 15 and a rear arm 16 on which the lower ends of straps 17 are engaged and removably secured. The straps 17 support the riflescope 11. The top of the projection 13 is formed with an aperture 18 engaged by a peg 19 projecting from the member 14 for aiding in rotatively mounting the said member 14.

An abutment member 20 projects upwards from the base 12 into the path of rotation of the mounting 14 which is formed with a recess 21 for accommodating this abutment member 20. An adjustment screw 22 threadedly engages the abutment 20 for adjustment to properly align the telescope with the shooting path of the rifle. Referring to Fig. 3 it should be noticed that the mounting member 14 may swing counterclockwise, while its clockwise swing is limited by the position of the adjustment screw 22.

A rod 23 passes thru the mounting 14 and is centrally provided with a slot 24 engaged by a pin 25 for limiting the sliding positions thereof. One end of the rod 23 is formed with a hook 26 engaging the abutment 20 for holding the mount 14 against the adjustment screw 22, and the other end is threaded and threadedly engages a knob 27. A pair of vertical pins 28 in the mounting 14 and on opposite sides of the knob, engage in a peripheral groove in the knob for rotatively holding the knob in place. The knob 27 may be rotated to move the rod 23 for disengaging the hook 26, as indicated by the dot-dash lines 29 of Fig. 4.

For applying the telescope 11 to another gun it may be removed from gun 10 at the straps 17 for engagement upon a mount similar to mount 14, or it may be removed from the gun 10 at the base mount member 12 for engagement upon a gun not provided with this device. In any case the telescope may be properly aligned and adjusted on the gun by manipulation of screw 22 and locking same in the new position by manipulation of the knob 27.

The modified form of the device illustrated in Fig. 7 discloses the base 12' provided with a flanged circular projection 13' rotatively engaged by the mount member 14'. Otherwise the device is the same as described in the preferred form, that is this device is provided with the same locking means shown in Figs. 1 to 6.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A telescope mount for a rifle, comprising a base member provided with a projecting abutment, and arranged for attachment to a rifle, an adjustment screw threadedly engaged in the abutment, a mount member rotatively connected with the said base and arranged for supporting a telescope, the said abutment being disposed in the path of motion of the said mount member, the mount member being formed with a recess for accommodating the abutment, a rod slidably mounted in the mount member, and having a central slot, a pin carried by the mount member engaging the said slot for limiting the movement of the rod, a hook at one end of the rod and engaging the abutment for holding the mount member against the said adjustment screw, a knob provided with a peripheral groove, pins engaging in the groove for rotatively holding the knob with respect to the mount member, and the knob being threadedly connected with the rod for moving the rod upon rotation of the knob.

2. A telescope mount for rifles comprising a base member provided with a projecting abutment, and arranged for attachment to a rifle, an adjustment screw threadedly engaged in the abutment, a mount member rotatively connected with the said base, and arranged for supporting a telescope, the said abutment being disposed in the path of motion of the said mount member, the mount member being formed with a recess for accommodating the abutment, a rod slidably mounted in the mount member, a hook at one end of the rod and engaging the abutment for holding the mount member against the said adjustment screw, a knob provided with a peripheral groove, pins carried by the mount member engaging in the groove for rotatively holding the knob with respect to the mount member, and the knob being threadedly connected with the rod for moving the rod upon rotation of the knob.

3. A telescope mount for rifles, comprising a base member provided with a projecting abutment, and arranged for attachment to a rifle, an adjustment screw threadedly engaged in the abutment, a mount member rotatively connected with the said base, and arranged for supporting a telescope, the said abutment being disposed in the path of motion of the said mount member, the mount member being formed with a recess for accommodating the abutment, a rod slidably mounted in the mount member, and having a central slot, a pin carried by the mount member engaging the said slot for limiting the movement of the rod, a hook at one end of the rod and engaging the abutment for holding the mount member against the said adjustment screw, a knob and means for rotatively holding the knob on the mount member the knob being threadedly connected with the rod for moving the rod upon rotation of the knob.

In testimony whereof I have affixed my signature.

PHILLIP H. MEISE.